United States Patent [19]

Sarian et al.

[11] Patent Number: 5,849,804
[45] Date of Patent: Dec. 15, 1998

[54] RECOVERY OF POLYAMIDES FROM COMPOSITE ARTICLES

[75] Inventors: Arlen K. Sarian, Lafayette, Colo.; Alan C. Handermann, Asheville, N.C.; Simon Jones, Leimen, Germany; Edward Alan Davis, Pulaski, Va.; Atish Adhya, Asheville, N.C.

[73] Assignees: BASF Corporation, Mt. Olive, N.J.; BASF Aktiengesellschaft, Ludwigshafen, Germany

[21] Appl. No.: 670,948

[22] Filed: Jun. 26, 1996

Related U.S. Application Data

[60] Provisional application No. 60/000,667, Jun. 29, 1995.
[51] Int. Cl.$^6$ .................................................. C08J 11/04
[52] U.S. Cl. ........................ 521/49.8; 521/49; 521/49.5; 521/40; 528/492; 528/493
[58] Field of Search ........................ 521/49, 49.5, 49.8, 521/40; 528/492, 493

[56] References Cited

U.S. PATENT DOCUMENTS

| | | | |
|---|---|---|---|
| 2,742,440 | 4/1956 | Stott et al. | 521/49.8 |
| 2,958,677 | 11/1960 | Kleinschmidt | 260/78 |
| 3,696,058 | 10/1972 | Teti | 521/49.8 |
| 5,169,870 | 12/1992 | Corbin et al. | 521/49.8 |
| 5,241,066 | 8/1993 | Davis et al. | 540/540 |
| 5,430,068 | 7/1995 | Subramanian | 521/40 |

FOREIGN PATENT DOCUMENTS

| | | |
|---|---|---|
| 0 603 434 A1 | 12/1992 | European Pat. Off. |
| 1046304 | 3/1952 | Germany |

*Primary Examiner*—James J. Seidleck
*Assistant Examiner*—Olga Asinovsky

[57] ABSTRACT

A process for recovering polyamide from composite articles that contain polyamide involves (a) subjecting at substantially nondepolymerizing conditions the composite article to a solvent for polyamide for a time sufficient to dissolve substantially all of the polyamide and leaving an insoluble fraction; (b) separating insoluble fraction of the composite article from the dissolved polyamide; and (c) precipitating the dissolved polyamide with appropriate precipitants.

6 Claims, 1 Drawing Sheet

3
RECOVERY OF POLYAMIDES FROM COMPOSITE ARTICLES

RELATED APPLICATION

The present application claims the benefit of U.S. provisional application Ser. No. 60/000,667, filed Jun. 29, 1995.

FIELD OF THE INVENTION

The present invention relates generally to recovering polyamide from polyamide-containing composite articles.

BACKGROUND OF THE INVENTION

As used herein, the term "high purity" means a purity level greater than 90% as measured by the Kjeldahl nitrogen analysis method.

As used herein, the term "nondepolymerizing conditions" means conditions that do not result in a relative viscosity (RV) decrease of greater than 25% as measured in 90% formic acid in a modified ASTM 0789 test (1% polymer solution).

Polyamides are used in many articles. Nylon 6 and nylon 6,6 are representative polyamides and are among the most widely used. These polyamides are present in, among other things, a wide range of fabrics, carpets, films, moldings, etc. Most often, however, polyamides are not the exclusive material present. They are commonly combined with other plastics, fillers, additives, etc. For example, carpets made from nylon face fiber often include polypropylene, latex and calcium carbonate as backing materials.

The recovery of polyamides is gaining in importance as environmental awareness increases and landfills become full. It is preferred to recover polyamides in as high a purity as possible. The higher the purity, the broader the opportunity for reuse. Recovery of pure polyamides from composites, however, has remained difficult. Because full separation of polyamide remains difficult, many methods of recovering polyamides deal with leaving it in composites that are used for low quality products like pallets and building materials for gardens and landscaping. It is desirable, as noted already, to be able to use recovered polyamide to make materials that require high grade nylons, like fibers.

The recovery of fiber grade caprolactam from nylon 6 face yarns is described in U.S. Pat. No. 5,169,870 to Corbin et al. The recovery of caprolactam from mixed materials using dissolution is described in U.S. Pat. No. 5,241,066 to Davis et al.

There remains a need for ways to recover polyamides in a form pure enough to be reused without limitation on the products made from the recovered polyamide, e.g., fibers or thin-walled injection moldings.

SUMMARY OF THE INVENTION

The present invention addresses the needs in a process for recovering polyamide from composite articles that contain polyamide. The method involves (a) subjecting, at substantially nondepolymerizing conditions, the composite article to a solvent for polyamide for a time sufficient to dissolve substantially all of the polyamide and leave an insoluble fraction of the composite article; (b) separating insoluble fraction of the composite article from the dissolved polyamide; and (c) precipitating the dissolved polyamide with appropriate precipitants.

It is an object of the present invention to provide a process for recovering high purity polyamide from polyamide-containing products and composites.

DETAILED DESCRIPTION OF THE PREFERRED EMBODIMENTS

Figure 1:
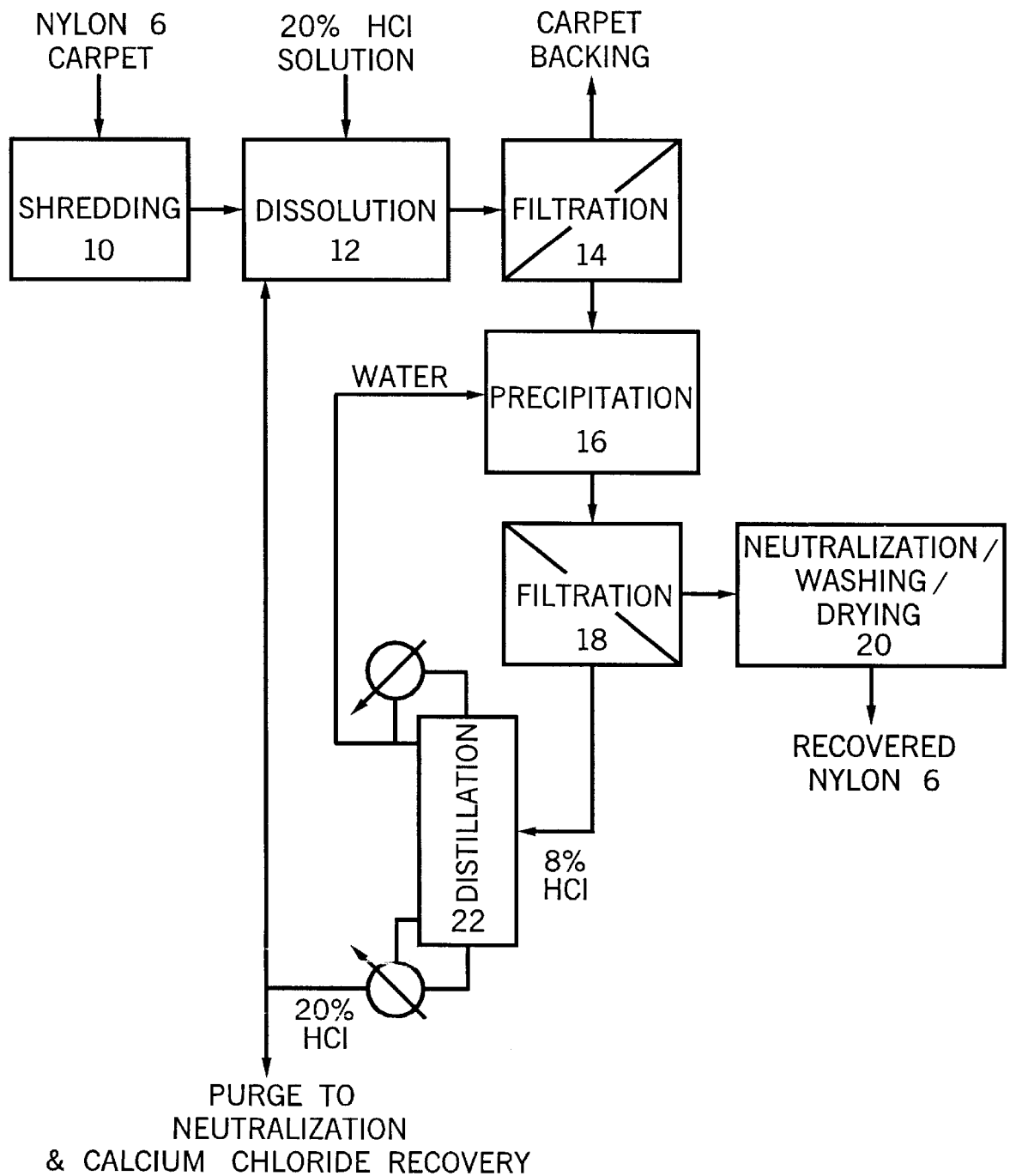
FIG. 1 is a schematic illustration of an exemplary process according to the present invention.

To promote an understanding of the principles of the present invention, descriptions of specific embodiments of the invention follow and specific language describes the same. It will nevertheless be understood that no limitation of the scope of the invention is thereby intended, and that such alterations and further modifications, and such further applications of the principles of the invention as discussed are contemplated as would normally occur to one ordinarily skilled in the art to which the invention pertains.

In the present invention, a composite product containing polyamide is dissolved in a solvent which is generally not a solvent for the non-polyamide components of the composite or which does not generally dissolve the non-nylon components of the composite at the conditions (e.g., temperature, dissolution time and solvent concentration) used. The dissolved polyamide is separated from the still solid non-polyamide components of the composite. The polyamide is recovered from solution by precipitation.

Useful solvents for the nylon component include known polyamide solvents such as inorganic acids, organic acids, phenols, cresols, alcoholic solutions of alkaline earth halides, glycols (e.g., ethylene glycol), or aromatic alcohols. Useful organic and inorganic acids include, but are not limited to, formic acid (60–100%), sulfuric acid (30–60%), phosphoric acid (70–85 wt. %), hydrochloric acid (15–40%), acetic acid, nitric acid, etc. Useful aromatic alcohols include phenylmethyl alcohol, phenylethyl alcohol and benzyl alcohol. Other solvents include lactams (e.g., caprolactam) or lactones. Combinations of these solvents may also be used. The currently preferred solvent is hydrochloric acid (15–40%).

When the solvent is a strong acid, elevated temperatures and long dissolution times should be avoided, since degradation of the polyamide may take place and make recovery from solution difficult. If heating is used at all, it should be moderate (about 20° C. to about 100° C.). Temperatures between 20° C. and 60° C. are preferred.

The length of time for the dissolution varies. For practical reasons and to minimize degradation, the short times are preferred. The time required for substantially complete dissolution will, of course, depend on the conditions (size of sample, acid type, concentration, temperature) used. Generally, dissolution times on the order of 2–30 minutes are preferred. The polyamide in the composite is dissolved in an appropriate solvent. The undissolved fractions are then separated from the dissolved polyamide solution. Separating the fractions may be accomplished through filtration or gravity settling. It is contemplated that the undissolved fraction can be separately reprocessed, either by further separation of the components or by compounding the material as is.

The dissolved polyamide fraction obtained from the separation step is treated with appropriate precipitating conditions to yield a polyamide precipitate. The precipitating conditions may include conventional polymer precipitating agents such as dilute acids, water, short chain aliphatic alcohols, or combinations of these. The precipitating conditions may also involve cooling. For example, if hot solvents are used in dissolution, it is advantageous to achieve precipitation by cooling.

The precipitate may be subjected to gentle drying. Especially beneficial is drying in a vacuum or in the presence of an inert gas at reduced temperature. Drying in vacuum or in the presence of an inert gas at a temperature ranging between 40° C. and 100° C. was found to be of benefit. If acid is used as the solvent, neutralizing residual acid and washing the filter cake with water may be beneficial.

Further processing of the solvent recovered after filtration of the polyamide precipitate is also possible. Distillation with separation of the solvent from the precipitating agent may be necessary, but this procedure makes possible full recycling of all materials used in the process. The precipitating agent may be recycled to be used in a new precipitation phase, and the solvent may be recovered for renewed use.

It may, in some circumstances, be advantageous to first reduce the size of the composite scrap. A preliminary mechanical separation step is advantageous for such size reduction. Such a step may be accomplished using a guillotine cutter, rotary cutter, shredder, grinder, hammermill and vibrating screens or a series of combinations of these.

FIG. 1 illustrates schematically an exemplary process of the present invention practiced on a carpet. As shown in FIG. 1, a carpet containing nylon 6 may be first reduced in size by, for example, shredding 10. Following such optional size reduction, the carpet is subjected to dissolution 12, where the nylon 6 is dissolved from the remainder of the carpet. Dissolution using 20% HCl is shown. The dissolved nylon 6 is separated from the insoluble materials (like the carpet backing) by, for example, filtration 14. Precipitation 16 follows next to recover the nylon 6 from solution. In filtration 18, nylon 6 is separated from the supernatant. Neutralization, washing/drying step 20 follows to yield relatively pure recovered nylon 6.

Additionally, as also shown in FIG. 1, the solvent (here HCl) may be reused in the process. If dilution of the solvent with water is used to cause precipitation in step 16, distillation 22 may be used to recover water for reuse in precipitation step 16 and the reconcentrated acid routed back to dissolution step 12. As indicated, if desired, the calcium chloride which also is dissolved in the solvent may be recovered.

The invention will be described by reference to the following detailed examples. The Examples are set forth by way of illustration, and are not intended to limit the scope of the invention. In the examples, all parts are part by weight unless otherwise specified. As demonstrated in the following examples, the process of the invention leads to the recovery of polyamide exhibiting properties comparable to those of virgin polyamide.

The following methods are used in the Examples:
Relative Viscosity: Relative Viscosity (RV) is measured in 90% formic acid using a modified ASTM 0789 test (1% polymer solution).
Nylon Purity: Nylon Purity is measured by the Kjeldahl nitrogen analysis method.

EXAMPLES 1–4
RECOVERY OF NYLON 6 USING HCL

A piece of nylon 6 face yarn carpet is placed in 20% hydrochloric acid at 40° C. and dissolution times of 2 to 30 minutes. The nylon face fiber dissolves very readily and quickly, leaving the primary backing, the latex with the calcium carbonate filler and the secondary backing intact. Some of the calcium carbonate reacts with the hydrochloric acid to form calcium chloride. The solution is filtered to remove insoluble materials.

The hydrochloric acid solution, with the dissolved nylon, is diluted with water. When the dilution reaches 12 to 13%, the nylon begins to precipitate. Initially, the precipitate is in the form of viscous, pitch like, sticky fluid. Upon further dilution, the precipitate begins to solidify in the form of film and particulate matter. Dilution to about 5% results in near complete precipitation. The diluted hydrochloric acid solution is concentrated by evaporation for reuse.

The precipitated nylon is subsequently filtered, neutralized, washed with water several times and dried. The intact carpet backing is also washed and dried. The purity of the recovered nylon and the relative viscosity are measured. The results are presented in Table 1.

TABLE 1

| Example | Dissolving Time, min. | *Nylon Purity, % | RV (in formic acid) |
|---|---|---|---|
| 1 | 2 | 93.1 | 2.48 |
| 2 | 5 | 94.3 | 2.73 |
| 3 | 15 | 91.5 | 2.54 |
| 4 | 30 | 90.8 | 2.54 |

*By this method, pure nylon 6 chips typically result in about 95% purity.

EXAMPLES 5–9
RECOVERY OF NYLON 6 AND NYLON 6,6 USING $H_2SO_4$

For examples 5–7, nylon 6 face yarn carpet is placed in sulfuric acid at concentrations of 40% to 60%, temperatures of 80° C. to 104° C., and dissolution times of 5–10 minutes. For examples 8 and 9, nylon 6,6 face yarn carpet is placed in sulfuric acid at concentrations of 50 and 60% at temperatures of 89°–100° C. for 5 minutes. The nylon face fiber dissolves very readily and rapidly, leaving the primary backing, the latex with part of the calcium carbonate and the secondary backing intact. Part of the calcium carbonate reacts with the sulfuric acid to form calcium sulfate.

The sulfuric acid solution, with the dissolved nylon, is diluted with water. When the dilution reaches 22 to 27%, the nylon, in both cases, begins to precipitate.

In the case of nylon 6, the precipitate is in the form of viscous, sticky, heavy fluid which settles at the bottom of the vessel. The diluted sulfuric acid in this case is decanted and as soon as the precipitate is exposed to water, the precipitate solidifies in the form of a film which is easily removed washed and dried.

In the case of nylon 6,6, the precipitate is in the form of small particle suspension in the diluted acid which is readily recovered by filtration.

The RV and purity are measured as described in Example 1. The results are reported in Table 2:

TABLE 2

| Example | Acid Conc., % | Acid Temp., °C. | RV | Nylon Purity, % | Dissolution Time, min. |
|---|---|---|---|---|---|
| NYLON 6 | | | | | |
| 5 | 60 | 104 | 2.71 | 92.0 | 5 |
| 6 | 50 | 102 | 2.75 | 89.8 | 5 |
| 7 | 40 | 80 | 2.65 | 85.6 | 10 |
| NYLON 6.6 | | | | | |
| 8 | 60 | 100 | 2.07 | 100 | 5 |
| 9 | 50 | 89 | 2.38 | 98 | 5 |

EXAMPLE 10
QUANTITATIVE RECOVERY OF NYLON 6 WITH HCL 125 grams of post consumer nylon 6 face yarn commercial carpet is placed in 700 ml of 25% hydrochloric acid at 50° C. and stirred for 20 minutes. The pieces of backing are removed, washed with water to remove the acid and dried. The acid solution with the dissolved nylon is filtered to remove residual carpet backing. The filtrate is diluted with water to about 8% to precipitate the nylon. The diluted acid is decanted and filtered. The precipitated nylon is neutralized with a dilute solution of sodium hydroxide, washed with water and dried in an oven at 80° C. for 3–4 hours.

The recovered nylon has 93.9% purity and 2.73 RV. 92.6% of the nylon face fiber from the carpet is recovered.

EXAMPLE 11
QUANTITATIVE RECOVERY OF NYLON 6 WITH FORMIC ACID 100 grams of post consumer nylon 6 face yarn commercial carpet is placed in 1250 ml of 85% formic acid at 40° C. and stirred for 30 minutes. The pieces of backing are removed, washed with water to remove the acid and dried. The acid solution with the dissolved nylon is filtered to remove residual carpet backing. The filtrate is diluted with 27% formic acid to precipitate the nylon. The diluted acid is decanted and filtered. The precipitated nylon is neutralized with a dilute solution of sodium hydroxide, washed with water and dried in an oven at 80° for 3–4 hours.

The recovered nylon has 91.5% purity and 3.00 RV. 92.2% of the nylon face fiber from the carpet is recovered.

EXAMPLES 12–15

For example 12, 30 grams of nylon 6 face yarn commercial carpet having a nylon content of 44% as measured by the Kjeldahl method and a remainder of polypropylene primary and secondary backing, latex binder and calcium carbonate filler was placed in 200 grams of 20% hydrochloric acid at a temperature of 20° C. The carpet pieces were kept in the acid for 20 minutes with mechanical stirring. The carpet backing was removed, washed to remove the acid and discarded. The acid solution with the dissolved nylon was filtered and diluted with 225 ml of water to precipitate the nylon. The precipitated nylon was recovered by filtration which was subsequently neutralized, washed and dried.

For example 13, the procedure of example 12 was followed, except the dissolving time was 10 minutes and the temperature of the acid was 50° C.

For example 14, the procedure of example 12 was followed, except the acid concentration was 30% and the temperature of the acid was 80° C. The acid was diluted with 375 ml of water.

For example 15, the procedure of example 12 was followed, except the acid concentration was 25% and the temperature of the acid was 80° C. Dissolving time was 30 minutes. The acid was diluted with 290 ml of water.

The RV, purity of the recovered nylon, and amount of recovered nylon are reported in Table 3.

TABLE 3

| EXAMPLE | TIME (MIN.) | CONC. (%) | TEMP. (°C.) | RECOVERY (%) | PURITY (%) | RV |
|---|---|---|---|---|---|---|
| 12 | 20 | 20 | 20 | 70.8 | 92.9 | 2.80 |
| 10 | 20 | 25 | 50 | 92.6 | 93.9 | 2.73 |
| 13 | 10 | 20 | 50 | 73.8 | 87.1 | 2.59 |
| 14 | 20 | 30 | 80 | 97.7 | 88.6 | 2.10 |
| 15 | 30 | 25 | 80 | 97.9 | 88.7 | 1.88 |

EXAMPLE 16
COMPARATIVE 13.5 grams of nylon 6 chip (RV=2.7) is placed in a mixture of 100 grams of 85% phosphoric acid and 21.4 grams of water and heated to 121° C. in 17 minutes, while stirring. Since only partial dissolution is observed, an additional 60.5 grams of 85% phosphoric acid is added and the mixture is heated to 128° C. Complete dissolution of the nylon 6 chip is obtained after an additional 19 minutes of stirring.

Heat is then removed and the mixture is allowed to cool to 40° C. over a period of 59 minutes. No precipitate is observed. Water is added to the cooled mixture; however, no precipitate is observed.

No precipitate can be produced until large volumes of water are added to the mixture, indicating that significant polymer degradation has occurred.

What is claimed is:

1. A process for recovering polyamide from composite articles that contain polyamide comprising:

(a) subjecting, at up to about 100° C., the composite article to a solvent selected from the group consisting of: organic acids; inorganic acids; phenols; cresols; alcoholic solutions of alkaline earth halides; aromatic alcohols; glycols; lactams; lactones and combinations thereof for between about 2 to about 30 minutes as sufficient to dissolve substantially all of the polyamide and leave an insoluble fraction;

(b) separating the insoluble fraction from the dissolved polyamide; and (c) precipitating the dissolved polyamide with a precipitant selected from the group consisting of water and dilute acid solutions.

2. A process according to claim 1, wherein the solvent is hydrochloric acid in a concentration range of 15–37%.

3. A process of claim 1, wherein said subjecting is accomplished at 20° C. to 80° C.

4. A process according to claim 1, further comprising:

(d) filtering precipitate from step (c);

(e) neutralizing the filtered precipitate;

(f) washing the neutralized precipitant; and (g) drying the washed precipitate in vacuum or under inert gas.

5. A process according to claim 1, wherein said drying is accomplished in vacuum or under inert gas at 50° to 100° C.

6. A process according to claim 1, wherein the composite article is carpet containing polyamide and other non-polyamide backing components.

* * * * *